US006643267B1

United States Patent
Karia et al.

(10) Patent No.: US 6,643,267 B1
(45) Date of Patent: *Nov. 4, 2003

(54) METHOD AND APPARATUS FOR TRACING A VIRTUAL CONNECTION

(75) Inventors: Snehal G. Karia, Fremont, CA (US); Dean C. Cheng, Fremont, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,268

(22) Filed: Jun. 30, 1999

(51) Int. Cl.[7] .............................................. H04L 12/56
(52) U.S. Cl. ....................................... 370/252; 255/397
(58) Field of Search ................................. 370/229–234, 370/241–253, 254–258, 395.2, 395.21, 236.1, 236.2, 241.1, 397, 399

(56) References Cited

U.S. PATENT DOCUMENTS

| | | |
|---|---|---|
| 4,455,644 A | 6/1984 | Fox et al. |
| 4,471,480 A | 9/1984 | Haussmann et al. |
| 4,633,246 A | 12/1986 | Jones et al. |
| 4,841,560 A | 6/1989 | Chan et al. |
| 5,278,977 A | 1/1994 | Spencer et al. |
| 5,337,307 A * | 8/1994 | Sato et al. ................... 370/248 |
| 5,634,097 A | 5/1997 | Ashi et al. |
| 5,648,965 A | 7/1997 | Thadani et al. |
| 5,659,540 A | 8/1997 | Chen et al. |
| 5,710,760 A | 1/1998 | Moll |
| 5,812,528 A | 9/1998 | VanDervort |
| 5,872,770 A | 2/1999 | Park et al. |
| 5,898,669 A | 4/1999 | Shimony et al. |
| 5,901,141 A | 5/1999 | Gruber et al. |
| 6,023,455 A | 2/2000 | Takahashi |
| 6,049,542 A * | 4/2000 | Prasad ......................... 370/386 |

OTHER PUBLICATIONS

The ATM Forum Technical Committee, "Private Network–Network Interface Specification Version 1.0 Addendum (Soft PVC MIB)," ATM Forum document number af–pnni–0066.000, pp. 1–18 (Sep. 1996).
The ATM Forum Technical Committee, "Private Network–Network Interface (PNNI) Version 2.0 Living List," ATM Forum document number LTD–CS–RA–PNNI–02.03, pp. 1–11 and 69–84 (Jul. 1998).
"ATM Routing," ESP 2.0 Installation and Operation, Chapter 4, pp. 4–1 through 4–14, www.cisco.com, Cisco Systems, Inc. (date before Jun. 30, 1999).

(List continued on next page.)

*Primary Examiner*—Salvatore Cangialosi
(74) *Attorney, Agent, or Firm*—Blakely, Sokoloff, Taylor & Zafman LLP (57) ABSTRACT

A method and apparatus for tracing a virtual circuit. A request message is received from a trace originating node. The request message includes a trace transit list. The trace transit list includes one or more element types in a vendor specific information portion of the trace transit list. At least one of the element types is a node level call processing latency element, a network level call processing latency element, an egress physical port identifier element, an ingress physical port identifier element, an ingress logical port identifier element, or a time stamp element. The one or more element types are added to the vendor specific information portion of the trace transit list. The request message is transmitted toward a trace terminating node. An acknowledge message is received from the trace terminating node. The acknowledge message includes the trace transit list copied from the request message to the acknowledge message by the trace terminating node.

102 Claims, 4 Drawing Sheets

OTHER PUBLICATIONS

"Asynchronous Transfer Mode (ATM) Switching," Internetworking Technology Overview, Chapter 21, pp. 21–7 through 21–12 (date before Jun. 30, 1999).

"Asynchronous Transfer Mode (ATM) Switching, " Telecommunications Information, p. 1, www.ee.umanitoba.ca/~blight/telecom.html (Jun. 17, 1999).

"The ATM Cell," ATM Cell, pp. 1–2, http://ganges.cs.tcd.ie/4ba2/atm/ATMCell.html (Jun. 17, 1999).

The ATM Forum Technical Committee, "Private Network–Network Interface (PNNI) Version 2.0 Living List," ATM Forum Document No. LTD–PNNI–2.00, pp. 1–4, 12, and 89–98 (Dec. 1997).

* cited by examiner

METHOD AND APPARATUS FOR TRACING A VIRTUAL CONNECTION

FIELD OF THE INVENTION

The present invention relates generally to monitoring operation and maintenance of communication networks. In particular, it is directed to collecting network parameters while tracing the route of a virtual connection between two nodes of a network.

THE BACKGROUND OF THE INVENTION

Connection oriented networks, such as an Asynchronous Transfer Mode (ATM) wide area networks running Switched Virtual Circuit (SVC) services over Private Network-to-Network Interface (PNNI), can route messages through a myriad of possible connections between an originating node and a terminating node using many intermediate nodes. Administration and maintenance of such a network is a significant challenge. It is important to be able to obtain real-time information about message routing and network performance to administer and maintain the network.

Figure 1:
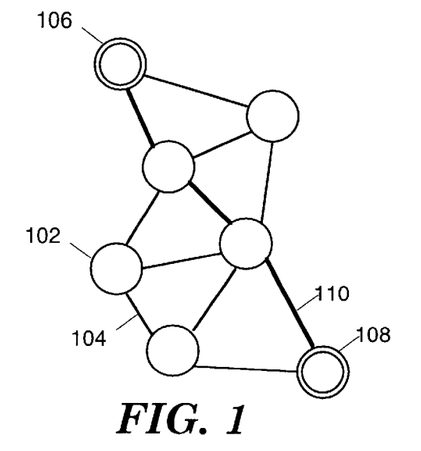
FIG. 1 shows an exemplary physical structure of an ATM network.

FIG. 1 illustrates an exemplary physical structure of an ATM network. An ATM network consists of a set of ATM switches 102 interconnected by point-to-point ATM links 104 or interfaces. ATM networks are fundamentally connection oriented. A virtual circuit 1110 needs to be set up across the ATM network from an originating node 106 to one or more terminating nodes 108 prior to transferring data. ATM circuits are of two types: virtual paths, identified by virtual path identifiers (VPI); and virtual channels, identified by the combination of a VPI and a virtual channel identifier (VCI). A virtual path is a bundle of virtual channels, all of which are switched transparently across the ATM network on the basis of the common VPI. All VCI and VPI, however, have only local significance across a particular link, and are remapped, as appropriate, at each switch. PNNI provides a protocol for exchanging information between switches to establish and maintain ATM circuits.

The PNNI protocol used in ATM networks provides an example of facilities that can be used to provide information for administration and maintenance of a connection oriented network. Data is transmitted in an ATM network in the form of cells made up of 8 bit octets. Each cell has a 5 octet header and a 48 octet data payload. The header provides the routing information for the cell. The header includes a payload type field. Cells can be identified by the payload type field as carrying an Operation, Administration, and Maintenance (OAM) message. This indicates that the data carried by the cell is part a message for the switch. The OAM message is assembled from the cells and processed by the switch.

Figure 2:
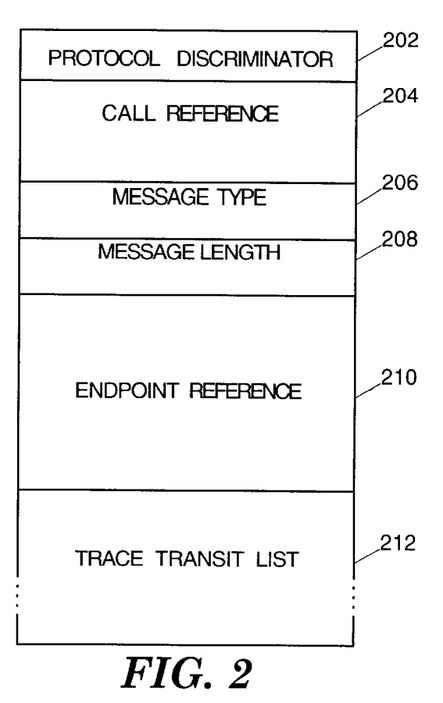
FIG. 2 shows a structure of an ATM message that includes a TTL.

FIG. 2 illustrates the structure of an OAM message. Each message consists of a list of octets. An embodiment of the present invention is particularly directed to. messages having a message type 206 of SETUP, ADD PARTY, or TRACE CONNECTION. A SETUP message is used to establish a connection from a source node that originates the message to a destination node specified by the endpoint reference octets in the message. An ADD PARTY message adds a destination node to an existing connection. A TRACE CONNECTION message is used to determine the path taken by an existing connection. These three message types will be referred to collectively as request messages. Acknowledge messages are returned to the originating node when a request message is received by the destination node. SETUP is acknowledged by CONNECT if the connection is successfully established, and RELEASE if not. ADD PARTY is acknowledged by ADD PARTY ACKNOWLEDGE if the additional destination is successfully added, and ADD PARTY REJECT if not. TRACE CONNECTION is acknowledged by TRACE CONNECTION ACKNOWLEDGE.

The PNNI facility allows a path of a Switched Virtual Circuit (SVC) to be traced in real time by appending a Trace Transit List (TTL) Information Element (IE) to a request message. The TTL includes various octets which can provide valuable information about the call at every network node. These octets include parameters like Node Id and Port Id, Call Reference Values, and so forth. It will be appreciated that there are many possible ATM circuits between any two nodes in an ATM network if the network is large. An ATM circuit in a large network can include many switches. This makes the task of locating network problems and inefficiencies difficult. TTLs can be used to locate network problems and to optimize performance.

Figure 3:
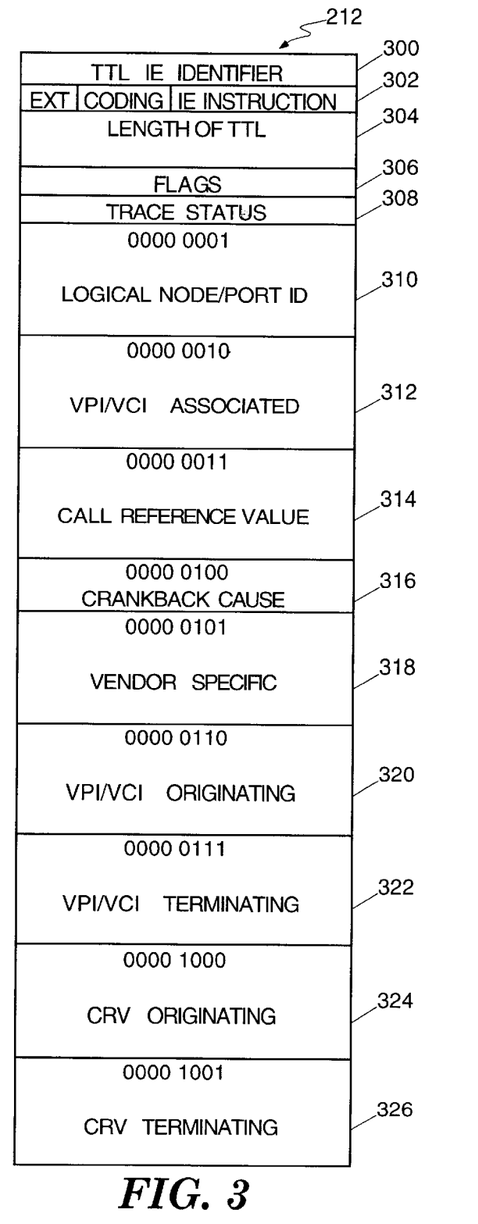
FIG. 3 shows a structure of a TTL.

A SETUP or ADD PARTY message may include a TTL 212. A TRACE CONNECTION message always has a TTL. The TTL 212 records the path traversed by the request message from the source node to the trace destination node. FIG. 3 shows the structure of the TTL. If a TTL IE is included in the message, the receiving node adds tracing information to the TTL based on the state of the Hierarchy Trace (H), Crankback Trace (C), Clear Call at Destination (X), VPI/VCI Trace (V), and Call Reference Value Trace (A) flags in the TTL flags octet 306. Each node traversed by the message (including the source node) adds one entry to the TTL IE before forwarding the message to the outgoing interface. The outgoing interface is determined from the local connection table using the call reference and, for a point-to-multipoint connection, the endpoint reference. The source node controls what path information is recorded by setting the H and C flags in the TTL IE. If both the H and C flags are set to 0, only lowest level information of the final path, i.e., not including the failed paths, is recorded. If the H flag is set to 1, higher level information is also recorded. If the C flag is set to 1, all attempted paths including the final one are recorded. The H and C flags are ignored for a TRACE CONNECTION MESSAGE.

Path tracing, which is initiated by a SETUP or ADD PARTY request message, sets up a connection in the forward direction and returns the results in the resulting acknowledge message. The path trace can immediately release the call used to perform the trace or leave it up. Test connections in support of path tracing can be initiated at the source node by a network management action toward a called party number. Alternatively, an administrative action can cause all user initiated calls at a given User-to-Network Interface (UNI) to be traced. In the first case, the trace indicates that the call should be cleared immediately upon reaching the destination node. In the second case, the call is left up. Path tracing is supported for both point-to-point and point-to-multipoint connections. Point-to-point path tracing is used to trace the path of a proposed point-to-point connection from a given source node to a called party number. Point-to-multipoint path tracing is used to trace the path of a branch from a given source node on an existing point-to-multipoint connection to a new party. In both cases, the rules for SETUP and ADD PARTY apply.

If a request message with a TTL is received at a trace destination node, the trace destination node sends the source node an acknowledge message that includes a copy of the received TTL. The destination node acknowledges a connection trace request by copying the content of the trace transit list IE in the request message to the acknowledge message, setting the trace status field to "trace completed normally," and sending the acknowledge message on the incoming interface. When a node receives an acknowledge message, it forwards it to the incoming link. The incoming interface is determined from the local connection table using the call reference and, for a point-to-multipoint connection, the endpoint reference.

FIG. 3 shows the structure of the TTL IE 212. The TTL is an ordered list. Interpretation of octet groups within a TTL is position dependent. Every TTL includes a TTL Identifier octet 300, an octet that includes an Extended flag, a coding standard value, and an IE instruction field 302, two octets that give the length of the TTL contents 304, an octet that contains flags 306, an octet that provides the trace status 308, and a logical ID group 310, which is 27 octets that hold a logical node identifier and a logical port identifier. The logical ID. group is identified by having the value '0000 0001' in the first octet. The logical ID group may be repeated in its entirety up to 250 times. The TTL IE 212 may include any of eight additional octet groups.

If the V flag is set, in the flag octet 306, a 5 octet associated VPI/VCI group 312 will be included immediately following the logical ID group 310. The associated VPI/VCI group provides the Virtual Path Identifier (VPI) and the Virtual Channel Identifier (VCI) associated with the PNNI link identified by the logical node and port in the preceding logical ID group. The associated VPI/VCI group is identified by having the value '0000 0010' in the first octet and may be repeated in its entirety up to 250 times.

If the A flag is set in the flag octet 306, a 4 octet associated CRV group 314 will be included immediately following the associated VPI/VCI group 312, if present, or the logical ID group 310, otherwise. The associated CRV group provides the Call Reference Value (CRV) associated with the PNNI link identified by the logical node and port in the preceding logical ID group. The associated CRV group is identified by having the value '0000 0011' in the first octet and may be repeated in its entirety up to 250 times.

If the C flag is set in the flag octet 306, a 2 octet crankback cause group 316 will be included in the TTL by a node that generates a crankback. The crankback cause group provides a code that gives the reason for a connection failure. The crankback cause group is identified by having the value '0000 0100' in the first octet and may be repeated in its entirety up to 250 times.

If the X flag is not set in the flag octet 306, a 5 octet Originating VPI/VCI group 320 identified by having the value '0000 0110' in the first octet, a 5 octet Terminating VPI/VCI group 322 identified by '0000 0111', a 4 octet Originating CRV group 324 identified by '0000 1000', and a 4 octet Terminating CRV group 326 identified by '0000 1001' will be included. The two VPI/VCI groups provide the Virtual Path Identifier (VPI) and the Virtual Channel Identifier (VCI) at the originating and terminating nodes. The two CRV groups provide the Call Reference Values at the originating and terminating nodes. These four groups, if included, are included once. The two Originating groups are added by the source node and the two Terminating groups are added by the destination node.

Figure 4:
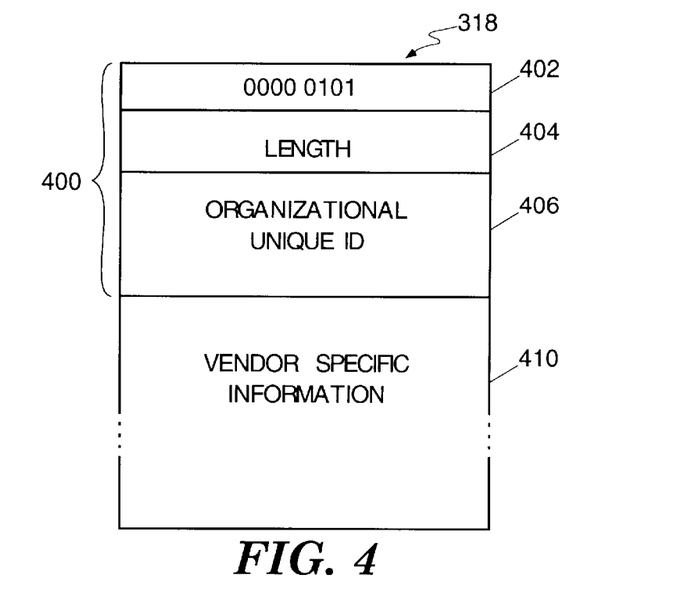
FIG. 4 shows a structure of a Vendor Specific group in a TTL.

The PNNI protocol provides a Vendor Specific group 318 which may be included in the TTL 212. FIG. 4 illustrates the Vendor Specific group as specified by the PNNI protocol. The Vendor Specific group is identified by having the value '0000 0101' in the first octet 402. The identification is followed by a two octet length field 404 that provides the length of the Vendor Specific group. The length is followed by a four octet Organizational Unique Identifier (OUI) 404. The remainder of the Vendor Specific group is filled by the Vendor Specific Information Octets (VSIOs) 410. The PNNI protocol does not define how the VSIOs may be used. Because the TTL IE is embedded as part of a Connection Trace Message as well as a Path Trace Message, useful information can be placed in the VSIO for both these facilities.

SUMMARY OF THE INVENTION

A method and apparatus for tracing a virtual circuit is provided. A request message is received from a trace originating node. The request message includes a trace transit list. The trace transit list includes one or more element types in a vendor specific information portion of the trace transit list. At least one of the element types is a node level call processing latency element, a network level call processing latency element, an egress physical port identifier element, an ingress physical port identifier element, an ingress logical port identifier element, or a time stamp element. The one or more element types are added to the vendor specific information portion of the trace transit list. The request message is transmitted toward a trace terminating node. An acknowledge message is received from the trace terminating node. The acknowledge message includes the trace transit list copied from the request message to the acknowledge message by the trace terminating node.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus are described for collecting information that is useful for the management and maintenance of connection oriented networks. Embodiments of the present invention can be used to place parameters in the Vendor Specific Information Octets (VSIOs) of a Trace Transit List Information Element (TTL IE) to provide tracing information for Asynchronous Transfer Mode (ATM) networks with Private Network-to-Network Interfaces (PNNI).

Figure 5:
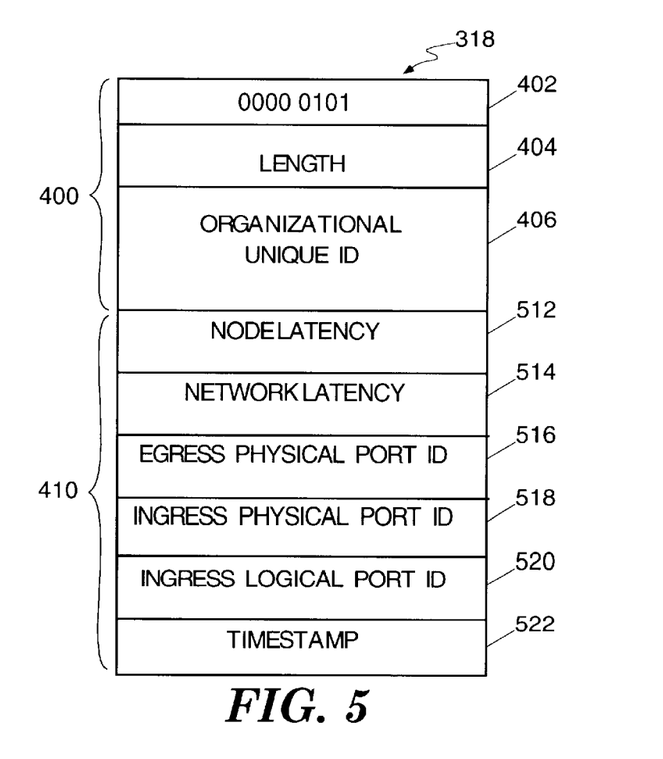
FIG. 5 shows a structure of a Vendor Specific group in a TTL that includes an embodiment of the present invention.

FIG. 5 illustrates the Vendor Specific group 318 as used for an embodiment of the present invention applied to an ATM network using PNNI protocol. The first seven octets 400 are filled in according to the PNNI protocol. The remaining VSIOs are filled in according to an embodiment of the present invention. The Organizational Unique ID (OUI) 406 of the Vendor Specific group 218 allows a node to determine if the VSIOs are recognized by the equipment servicing the node. If the OUI is recognized, then the VSIOs will be examined and elements will be inserted according to an embodiment of the present invention to match the elements inserted by the originating node. Otherwise, the VSIOs of an embodiment of the present invention will be ignored and passed through to the following node.

Using an embodiment of the present invention, one or more of six elements of an embodiment of the present invention may be included in the VSIOs 410. Each element of an embodiment of the present invention may include an identifying octet to allow a node to identify which of the elements of an embodiment of the present invention are present in the VSIOs.

A Node Level Call Processing Latency Element 512 contains two parts. The first part indicates the processing latency for a request message at a given node. The second part indicates the processing latency for an acknowledge message that is associated with the request message previously processed at this node, if the connection is established successfully. If the SETUP or ADD PARTY request fails, as indicated by a RELEASE or ADD PARTY REJECT acknowledge message, the second part is left undefined. The processing latency is measured as a delta of two time stamps. The first time stamp is taken when the request message arrives at a routing node, and the second time stamp is taken when the message is about to be forwarded to the next node. At an originating node, the first time stamp for a request message is taken when the Node Level Call Processing Latency Element is inserted, and the second time stamp for an acknowledge message is taken when the acknowledge message is processed by the originating node. The first part is included in the Node Level Call Processing Latency Element inserted in the request message, and the second part is inserted in the Node Level Call Processing Latency Element associated with this node when acknowledge message is returned from the trace terminating node. Each part is preferably contained in four octets and indicated in microseconds. The Node Level Latency element indicates the congestion level and processing speed of the node for establishing connections. It allows the network administrator to find performance bottlenecks for SVC/SPVC setups in the network. It can also be used to determine if the chosen route is optimal and effective. It further helps to diagnose and locate network partitions where the SVC/SPVC setups have performance problems. This element can be collected by a TRACE CONNECTION request message but it has less significance because message is tracing an established connection.

A Network Level Call Processing Latency Element 514 indicates the round-trip time beginning at the time when a request message arrives at a given node, and ends at the time with the receipt of an acknowledge message that is associated with the request message previously processed at this node. At an originating node, the time begins when the Network Level Call Processing Latency Element is inserted. This element is inserted in the request message but the value is not completed until in the acknowledge message is received. The network latency is preferably indicated in microseconds. For one embodiment of the invention, the Network Level Call Processing Latency Element is preferably eight octets. This allows a time stamp to be inserted in this element of the request message to record the start time. When the acknowledge message is received, the time stamp is replaced by the latency. Network Level Call Processing Latency can be used to determine if the chosen route is optimal and effective. It further helps to diagnose and locate network partitions where the SVC/SPVC setups have performance problems. This element can be collected by a TRACE CONNECTION request message but it has less significance because message is tracing an established connection.

An Egress Physical Port Identifier Element 516 indicates the physical port identifier of the egress port where a request message is transmitted to a succeeding node. Note that the physical port identifier is defined in the context of a given ATM switch and is different from the Logical Port ID 310. This element is inserted in the request message and is returned by the acknowledge message message. Preferably, the physical port identifier is contained in four octets.

An Ingress Physical Port Identifier Element 518 indicates the physical port identifier of the ingress port where the Element 516 indicates the physical port identifier of the egress port where a request message was received, defined in the context of a given ATM switch. At an originating node, the ingress port is designated even though it is not actually used. This element is inserted in the request message and is returned by the acknowledge message. Preferably, the physical port identifier is contained in four octets. Physical port identifiers for ingress and egress ports are useful because, in most switches, the logical port identifier does not identify the physical connection and the network administrator has to take further steps to identify the physical connection that corresponds to a logical port identifier.

An Ingress Logical Port Identifier 520 indicates the logical port identifier of the ingress port where the request message was received. The logical port identifier is defined in a fashion that can be recognized in the PNNI network domain of the logical port. This element is inserted in the request message and is returned by the acknowledge message. Preferably, the logical port identifier is contained in four octets. The Ingress Logical Port Identifier complements the logical port identifier inserted in the logical ID group 310. The logical port identifier inserted in the logical ID group indicates the logical port identifier of the egress port where the request message is to be transmitted. These two identifiers taken together identify the path taken by a call within the node.

A Time Stamp Element 522 contains two parts. The first part indicates the absolute time when a request message is received on the incoming port. The second part indicates the absolute time when an acknowledge message that is associated with the request message previously processed at this node is received on the incoming port. The first part is filled in when the Time Stamp element is inserted in the request message, and the second part is completed in the Time Stamp element associated with this node when acknowledge message is returned from the trace terminating node. Each of the two times is preferably based on GMT or another time system followed by the whole network, includes a four digit year, and is eight octets in length. At an originating node, the first part indicates the absolute time when a Time Stamp Element is inserted. The Time Stamp Element conveys the time taken on different nodes to trace a call using a single time reference and allows various routings to be compared.

Figure 6:
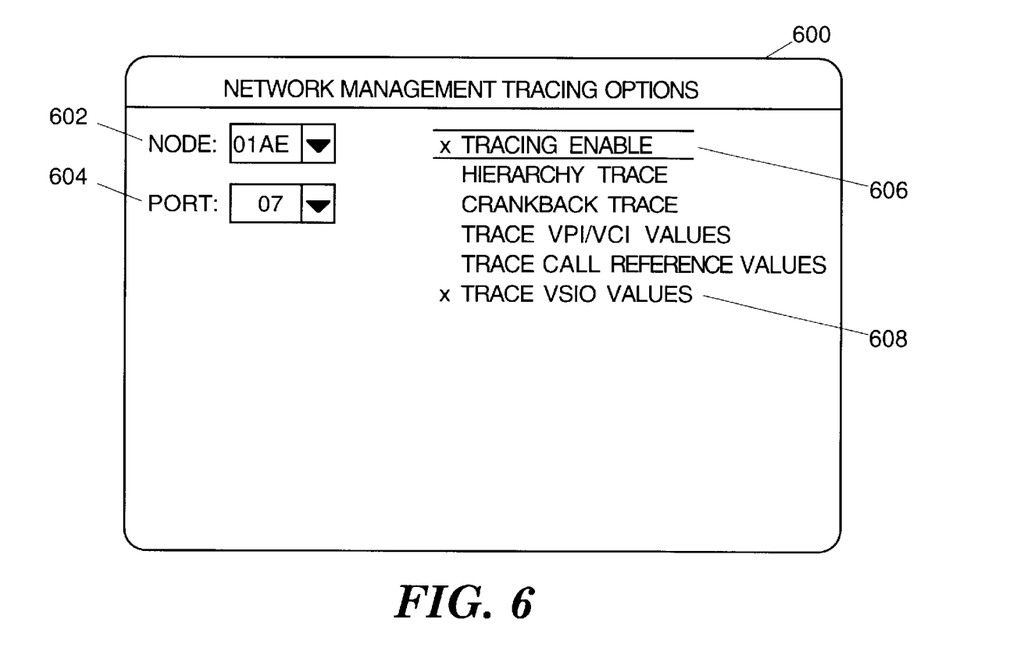
FIG. 6 shows a user interface screen that includes an embodiment of the present invention.
Figure 7:
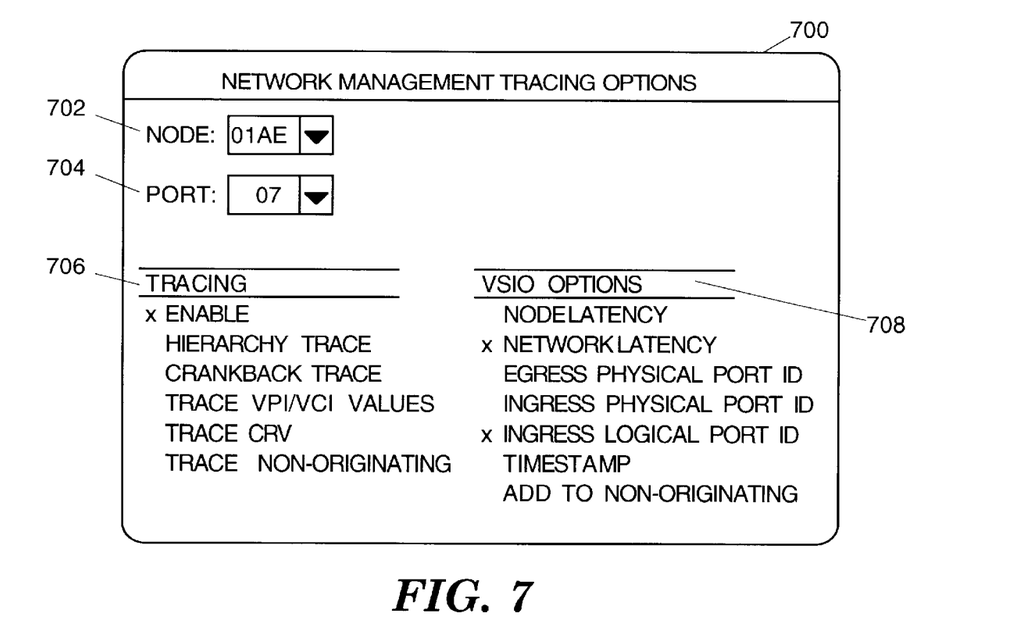
FIG. 7 shows a user interface screen that includes another embodiment of the present invention.

The VSIOs of an embodiment of the present invention can be added to test connections initiated at the source node by a network management action toward a called party number. Alternatively, an administrative action can cause all user initiated calls at a given User-to-Network Interface (UNI) to be traced and to include the VSIOs of an embodiment of the present invention. Further, an administrative action can cause a TTL with the VSIOs of an embodiment of the present invention to be added to all untraced request messages received at a specified node or node/port combination. This action can also cause the VSIOs to be added to a traced request message if not already present. The administrative action is preferably initiated by an administrator designating the information to be inserted using a Command Line Interface (CLI) or a Graphical User Interface (GUI) network management system. FIG. 6 shows a screen 600 from a network management system that allows tracing to be enabled 606 for a specific node 602 and port 604 and allows the VSIOs of an embodiment of the present invention to be enabled 608. FIG. 7 shows a screen 700 from another network management system that allows tracing to be enabled 706 for a specific node 702 and port 704 and allows the VSIOs of an embodiment of the present invention to be enabled individually 708. For one embodiment of the invention, VSIOs added by an intermediate node are removed from the acknowledgement message before forwarding toward the originating node.

While the elements of the TTL IE specified by the PNNI protocol are merely returned to the originating node by an acknowledge message, an embodiment of the present invention may insert data in fields of the elements provided by an embodiment of the present invention in an acknowledge message. The second part of the Node Level Call Processing Latency Element 512, containing the latency of the acknowledge message, is inserted in the returning acknowledge message. The timing for a Network Level Call Processing Latency Element 514 ends when the acknowledge message is received by the node that inserted the element and the latency value is inserted in the element in the acknowledge message. The second part of the Time Stamp Element 522, containing the absolute time when the acknowledge message is received, is inserted in the returning acknowledge message.

Figure 8:
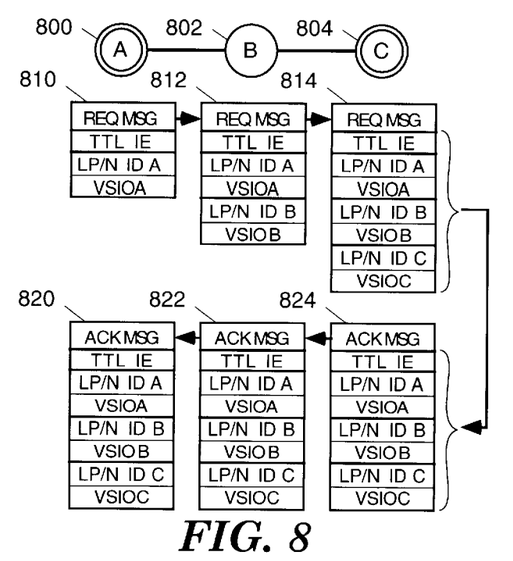
FIG. 8 shows a message passing through a network that includes an embodiment of the present invention.

FIG. 8 shows the messages associated with tracing a message that originates at a node A 800 and traverses a node B 802 to reach a destination node C 804. A request message 810 is transmitted from node A toward node C. A TTL IE, including the Logical Port/Node ID and VSIOs for node A, is appended to the message 810 based on the administrative designations for node A.

When a request message having a TTL, possibly including VSIOs of an embodiment of the present invention, is received by succeeding nodes, elements may be added to the TTL based on the PNNI flags 306 (FIG. 3). The VSIOs of an embodiment of the present invention will be ignored and passed through if the node does not recognize the OUI 406 of the Vendor Specific. group 318 (FIG. 4). If the OUI is recognized, then the VSIOs will be examined and elements will be inserted according to an embodiment of the present invention to match the elements inserted by the originating node. For one embodiment of the invention, VSIOs or a TTL may be added to the received request message if not already present. Each element of an embodiment of the present invention includes an identifying octet to allow a node to identify which of the elements of an embodiment of the present invention are present in the VSIOs.

Again referring to FIG. 8, node B receives the request message 810 from node A. If the PNNI flags indicate that an entry should be added by node B, the Logical Port/Node. ID, other PNNI elements as indicated by the flags, and the VSIOs for node B will be appended to the create the request message 812 that will be forwarded to node C 804. In the absence of administrative designations, node B will add the same VSIOs as were added by the preceding node A. If the administrator designates more VSIOs to be traced at node B than were designated at node A, and designates that non-originating messages should be traced at node B, then additional VSIOs will be added to the VSIOs inserted by node B as required by the node B administrative designations.

When the trace terminating node C 804 receives the request message 812 from node B, it appends trace elements in the same manner as described for node B 802 to create the request message 812. The TTL from this request message is copied into an acknowledge message 824 to be transmitted from node C toward node A. When node B receives the acknowledge message 824 it completes fields of the VSIOs for node B as required to create the acknowledge message 822. This acknowledge message is then forwarded to node A where the fields of the VSIOs for node A are completed as required to create the acknowledge message 820. Since node A is the trace originating node, the TTL the acknowledge message 820 is delivered for administrative action.

Figure 9:
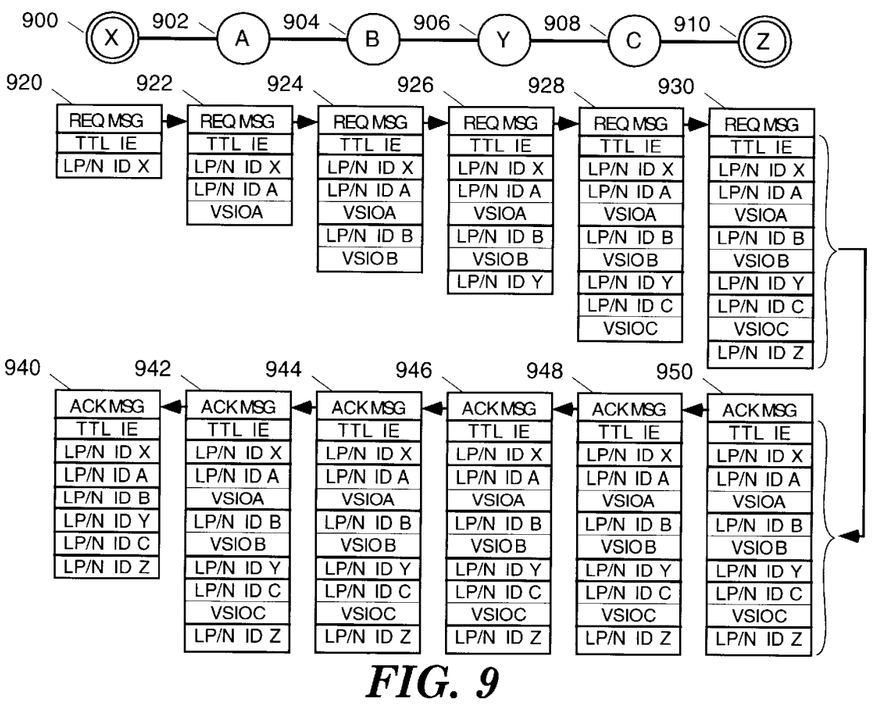
FIG. 9 shows a message passing through another network that includes an embodiment of the present invention.

FIG. 9 shows the messages associated with tracing a message that originates at a node X 900 and traverses nodes A 902, B 904, Y 906, and C 908 to reach a destination node Z 910. Nodes A, B, and C support the VSIOs of an embodiment of the present invention while nodes X, Y, and Z do not. A request message 920 is transmitted from node X toward node Z. A TTL IE, including the Logical Port/Node ID for node X, is appended to the message 920 based on the administrative designations for node X.

At node A 902, the Logical Port/Node ID and other PNNI elements are added as indicated by the PNNI flags and the VSIOs for node A are added as designated by administrative designations at node A to create the request message 922. Node B adds to the TTL of this message 922 to create the message 924 as described above with reference to FIG. 8. Node Y receives the message 924 from node B and adds the Logical Port/Node ID and other PNNI elements as indicated by the PNNI flags to create the message 926. However node Y will not recognize the OUI of the VSIOs and will simply forward the previous VSIOs without further action. Node C receives the message 926 from node Y and adds to the TFL as previously described for node B. If node C needs to refer to preceding VSIOs, it will refer to those of node B. Node Z receives the request message 928 from node C and adds TTL elements but not VSIOs to create the request message 930, as previously described for node Y.

Node Z copies the TTL to an acknowledge message 950 as previously described with reference to node C of FIG. 8. The acknowledge message is transmitted toward node X, with VSIOs possibly being completed by nodes A, B, and C. For one embodiment, node A recognizes that it is the originating node for the VSIOs because the are no earlier nodes that placed VSIOs in the TTL. Node A strips the VSIOs from the request message 942 received from node B to create the request message 940 transmitted to node X.

In the foregoing specification, the invention has been described with reference to specific exemplary embodiments thereof. It will, however, be evident that various modifications and changes may be made thereto without departing from the broader spirit and scope of the invention as set forth in the appended claims. The specification. and drawings are, accordingly, to be regarded in an illustrative rather than a restrictive sense.

What is claimed is:

1. A method for tracing a virtual circuit comprising:

receiving a request message from a trace originating node, said request message including a trace transit list, said trace transit list including one or more element types in a vendor specific information portion of the trace transit list, wherein at least one of said element types is a node level call processing latency element, a network level call processing latency element, an egress physical port identifier element, an ingress physical port identifier element, an ingress logical port identifier element, or a time stamp element;

adding the one or more element types to the vendor specific information portion of the trace transit list;

transmitting the request message toward a trace terminating node; and receiving an acknowledge message from the trace terminating node, said acknowledge message including the trace transit list copied from the request message to the acknowledge message by the trace terminating node.

2. The method of claim 1 further comprising, if the trace transit list includes the node level call processing latency element:

determining a first difference between a first arrival time for the request message and a first departure time when the request message is to be transmitted toward the trace terminating node;

inserting the first difference in the node level call processing latency element of the request message;

determining a second difference between a second arrival time for the acknowledge message and a second departure time when the acknowledge message is to be transmitted toward the trace originating node; and inserting the second difference in the node level call processing latency element of the acknowledge message.

3. The method of claim 2 where determining and inserting the second difference is performed only if the acknowledge message indicates that a connection was successfully established.

4. The method of claim 1 further comprising, if the trace transit list includes the network level call processing latency element:

recording a first arrival time for the request message; and inserting a difference between a second arrival time for the acknowledge message and the first arrival time, in the network level call processing latency element of the acknowledge message.

5. The method of claim 1 further comprising inserting a physical port identifier for a port on which the request message is to be transmitted in the egress physical port identifier element of the request message, if the trace transit list includes the egress physical port identifier element.

6. The method of claim 1 further comprising inserting a physical port identifier for a port on which the request message was received in the ingress physical port identifier element of the request message, if the trace transit list includes the ingress physical port identifier element.

7. The method of claim 1 further comprising inserting a logical port identifier for a port on which the request message was received in the ingress logical port identifier element of the request message, if the trace transit list includes the ingress logical port identifier element.

8. The method of claim 1 further comprising, if the trace transit list includes the time stamp element:

inserting a first absolute time when the request message was received in the time stamp element of the request message; and inserting a second absolute time when the acknowledge message was received in the time stamp element of the acknowledge message.

9. The method of claim 1 where each of the element types includes an element identification octet that is distinct from the element identification octet for each of the remaining element types.

10. The method of claim 1 where the virtual circuit is a virtual circuit in an asynchronous transfer mode network using private network to network interface protocol.

11. A method for tracing a virtual circuit comprising;

receiving a designation of one or more element types to be inserted in a vendor specific information portion of a trace transit list at a trace originating node, wherein at least one of said element types is a node level call processing latency element, a network level call processing latency element, an egress physical port identifier element, an ingress physical port identifier element, an ingress logical port identifier element, or a time stamp element;

transmitting a request message toward a trace terminating node, said request message having the trace transit list including vendor specific information octets with the designated element types; and receiving an acknowledge message from the trace terminating node, said acknowledge message including the trace transit list copied from the request message to the acknowledge message by the trace terminating node.

12. The method of claim 11 further comprising, if the designation includes the node level call processing latency element:

determining a first difference between a first time when the node level call processing latency element is inserted in the request message and a first departure time when the request message is to be transmitted toward the trace terminating node;

inserting the first difference in the node level call processing latency element of the request message;

determining a second difference between a second arrival time for the acknowledge message and a second time when the acknowledge message is processed; and inserting the second difference in the node level call processing latency element of the acknowledge message.

13. The method of claim 12 where determining and inserting the second difference is performed only if the acknowledge message indicates that a connection was successfully established.

14. The method of claim 11 further comprising, if the designation includes the network level call processing latency element:

recording a first time when the network level call processing latency element is inserted in the request message; and inserting a difference between a second time when the acknowledge message is received and the first time in the network level call processing latency element of the acknowledge message.

15. The method of claim 11 further comprising inserting a physical port identifier for a port on which the request message is to be transmitted in the egress physical port identifier element of the request message, if the designation includes the egress physical port identifier element.

16. The method of claim 11 further comprising inserting a physical port identifier for a designated ingress port in the ingress physical port identifier element of the request message, if the designation includes the ingress physical port identifier element.

17. The method of claim 11 further comprising inserting a logical port identifier for a designated ingress port in the ingress logical port identifier element of the request message, if the designation includes the ingress logical port identifier element.

18. The method of claim 11 further comprising, if the designation includes the time stamp element:
inserting a first absolute time in the time stamp element of the request message, said first absolute time being when the time stamp element was inserted; and
inserting a second absolute time in the time stamp element of the acknowledge message, said second absolute time being when the acknowledge message was received.

19. The method of claim 11 where each of the element types includes an element identification octet that is distinct from the element identification octet for each of the remaining element types.

20. The method of claim 11 where the virtual circuit is a virtual circuit in an asynchronous transfer mode network using private network to network interface protocol.

21. A network switch for connecting a virtual circuit comprising:
a trace transit list parser that identifies one or more element types present in a vendor specific information portion of a trace transit list, wherein at least one of said element types is a node level call processing latency element, a network level call processing latency element, an egress physical port identifier element, an ingress physical port identifier element, an ingress logical port identifier element, or a time stamp element;
a trace generator that adds the element types identified by the trace transit list parser, said element types being added to vendor specific information octets in a trace transit list of a request message;
a request message transmitter that transmits the request message toward a trace terminating node;
a trace modifier that modifies the element types identified by the trace transit list parser, said element types being modified in the vendor specific information octets in the trace transit list of an acknowledge message;
a acknowledge message transmitter that transmits the acknowledge message toward a trace originating node.

22. The network switch of claim 21 further comprising:
a difference unit that determines a first difference between a request message arrival time and a time that the request message is to be transmitted, and that determines a second difference between an acknowledge message arrival time and a time that the acknowledge message is to be transmitted; a trace assembly unit that inserts the first difference in the node level call processing latency element of the request message, and that inserts the second difference in the node level call processing latency element of the acknowledge message, if the trace transit list includes the node level call processing latency element.

23. The network switch of claim 22 where the trace assembly unit inserts the second difference only if the acknowledge message indicates that a connection was successfully established.

24. The network switch of claim 21 further comprising:
a time recorder that records a first arrival time for the request message;
a difference unit that determines a difference between an arrival time for the acknowledge message and the first arrival time; and
a trace assembly unit that inserts the difference in the network level call processing latency element of the acknowledge message, if the trace transit list includes the network level call processing latency element.

25. The network switch of claim 21 further comprising a trace assembly unit that inserts a physical port identifier for a port on which the request message is to be transmitted in the egress physical port identifier element of the request message, if the trace transit list includes the egress physical port identifier element.

26. The network switch of claim 21 further comprising a trace assembly unit that inserts a physical port identifier for a port on which the request message was received in the ingress physical port identifier element of the request message, if the trace transit list includes the ingress physical port identifier element.

27. The network switch of claim 21 further comprising a trace assembly unit that inserts a logical port identifier for a port on which the request message was received in the ingress logical port identifier element of the request message, if the trace transit list includes the ingress logical port identifier element.

28. The network switch of claim 21 further comprising a trace assembly unit that inserts a request message receipt time in the time stamp element of the request message, and inserts an acknowledge message receipt time in the time stamp element of the acknowledge message, if the trace transit list includes the time stamp element.

29. The network switch of claim 21 further comprising an element identification unit that inserts an element identification octet in each designated element type, where the element identification octet for each of the element types is distinct from the element identification octet for each of the remaining element types.

30. The network switch of claim 21 where the virtual circuit is a virtual circuit in an asynchronous transfer mode network using private network to network interface protocol.

31. A network switch for connecting a virtual circuit comprising:
a trace option store that holds a designation of one or more element types to be inserted in vendor specific information octets of a trace transit list, wherein at least one of said element types is a node level call processing latency element, a network level call processing latency element, an egress physical port identifier element, an ingress physical port identifier element, an ingress logical port identifier element, or a time stamp element;
a trace generator that adds the element types designated in the trace option store, said element types being added to the vendor specific information octets of the trace transit list of a request message; and
a request message transmitter that transmits the request message toward a trace terminating node.

32. The network switch of claim 31 further comprising:
a difference unit that determines a first difference between a first time when the node level call processing latency element is inserted in the request message and a time that the request message is to be transmitted, and that determines a second difference between an arrival time of an acknowledge message and a second time when the acknowledge message is processed;
a trace assembly unit that inserts the first difference in the node level call processing latency element of the request message, and that inserts the second difference in the node level call processing latency element of the acknowledge message, if the designation includes the node level call processing latency element.

33. The network switch of claim 32 where the trace assembly unit inserts the second difference only if the acknowledge message indicates that a connection was successfully established.

34. The network switch of claim 31 further comprising:
   a time recorder that records a first time when the network level call processing latency element is inserted in the request message;
   a difference unit that determines a difference between an arrival time for an acknowledge message and the first time; and
   a trace assembly unit that inserts the difference in the network level call processing latency element of the acknowledge message, if the designation includes the network level call processing latency element.

35. The network switch of claim 31 further comprising a trace assembly unit that inserts a physical port identifier for a port on which the request message is to be transmitted in the egress physical port identifier element of the request message, if the designation includes the egress physical port identifier element.

36. The network switch of claim 31 further comprising a trace assembly unit that inserts a physical port identifier for a designated ingress port in the ingress physical port identifier element of the request message, if the designation includes the ingress physical port identifier element.

37. The network switch of claim 31 further comprising a trace assembly unit that inserts a logical port identifier for a designated ingress port in the ingress logical port identifier element of the request message, if the designation includes the ingress logical port identifier element.

38. The network switch of claim 31 further comprising a trace assembly unit that inserts a request message time stamp element insertion time in the time stamp element of the request message, and inserts a receipt time of an acknowledge message in the time stamp element of the acknowledge message, if the designation includes the time stamp element.

39. The network switch of claim 31 further comprising an element identification unit that inserts an element identification octet in each designated element type, where the element identification octet for each of the element types is distinct from the element identification octet for each of the remaining element types.

40. The network switch of claim 31 where the virtual circuit is a virtual circuit in an asynchronous transfer mode network using private network to network interface protocol.

41. A program, embodied in data signals on a computer readable medium, for tracing a virtual circuit, said program comprising:
   a first segment for receiving a request message from a trace originating node, said request message including a trace transit list, said trace transit list including one or more element types in a vendor specific information portion of the trace transit list, wherein at least one of said element types is a node level call processing latency element, a network level call processing latency element, an egress physical port identifier element, an ingress physical port identifier element, an ingress logical port identifier element, or a time stamp element;
   a second segment for adding the one or more element types to the vendor specific information portion of the trace transit list;
   a third segment for transmitting the request message toward a trace terminating node; and
   a fourth segment for receiving an acknowledge message from the trace terminating node, said acknowledge message including the trace transit list copied from the request message to the acknowledge message by the trace terminating node.

42. The program of claim 41 further comprising;
   a fifth segment for determining a first difference between a first arrival time for the request message and a first departure time when the request message is to be transmitted toward the trace terminating node;
   a sixth segment for inserting the first difference in the node level call processing latency element of the request message, if the trace transit list includes the node level call processing latency element;
   a seventh segment for determining a second difference between a second arrival time for the acknowledge message and a second departure time when the acknowledge message is to be transmitted toward the trace originating node; and
   an eighth segment for inserting the second difference in the node level call processing latency element of the acknowledge message, if the trace transit list includes the node level call processing latency element.

43. The program of claim 42 where the second difference is determined and inserted only if the acknowledge message indicates that a connection was successfully established.

44. The program of claim 41 further comprising:
   a fifth segment for recording a first arrival time for the request message; and
   a sixth segment for inserting a difference in the network level call processing latency element of the acknowledge message, if the trace transit list includes the network level call processing latency element, said difference being the difference between a second arrival time for the acknowledge message and the first arrival time.

45. The program of claim 41 further comprising a fifth segment for inserting a physical port identifier for a port on which the request message is to be transmitted in the egress physical port identifier element of the request message, if the trace transit list includes the egress physical port identifier element.

46. The program of claim 41 further comprising a fifth segment for inserting a physical port identifier for a port on which the request message was received in the ingress physical port identifier element of the request message, if the trace transit list includes the ingress physical port identifier element.

47. The program of claim 41 further comprising a fifth segment for inserting a logical port identifier for a port on which the request message was received in the ingress logical port identifier element of the request message, if the trace transit list includes the ingress logical port identifier element.

48. The program of claim 41 further comprising:
   a fifth segment for inserting a first absolute time in the time stamp element of the request message, if the trace transit list includes the time stamp element, said first absolute time being when the request message was received; and
   a sixth segment for inserting a second absolute time in the time stamp element of the acknowledge message, if the trace transit list includes the time stamp element, said second absolute time being when the acknowledge message was received.

49. The program of claim 41 further comprising a fifth segment for including an element identification octet with each element type, where the element identification octet for each of the element types is distinct from the element identification octet for each of the remaining element types.

50. The program of claim 41 where the virtual circuit is a virtual circuit in an asynchronous transfer mode network using private network to network interface protocol.

51. The program of claim 41 where said data signals are signals embodied on computer-readable media or signals embodied in a carrier wave.

52. A program, embodied in data signals on a computer readable medium, for tracing a virtual circuit, said program comprising:
a first segment for receiving a designation of one or more element types to be inserted in a vendor specific information portion of a trace transit list, wherein at least one of said element types is a node level call processing latency element, a network level call processing latency element, an egress physical port identifier element, an ingress physical port identifier element, an ingress logical port identifier element, or a time stamp element;
a second segment for transmitting a request message toward a trace terminating node, said request message having the trace transit list including vendor specific information octets with the designated element types; and
a third segment for receiving an acknowledge message from the trace terminating node, said acknowledge message including the trace transit list copied from the request message to the acknowledge message by the trace terminating node.

53. The program of claim 52 further comprising:
a fourth segment for determining a first difference between a first time when the node level call processing latency element is inserted in the request message and a first departure time when the request message is to be transmitted toward the trace terminating node;
a fifth segment for inserting the first difference in the node level call processing latency element of the request message, if the designation includes the node level call processing latency element;
a sixth segment for determining a second difference between a second arrival time for the acknowledge message and a second time when the acknowledge message is processed; and
a seventh segment for inserting the second difference in the node level call processing latency element of the acknowledge message, if the designation includes the node level call processing latency element.

54. The program of claim 53 where the second difference is determined and inserted only if the acknowledge message indicates that a connection was successfully established.

55. The program of claim 52 further comprising:
a fourth segment for recording a first time when the network level call processing latency element is inserted in the request message; and
a fifth segment for inserting a difference between a second time when the acknowledge message is received and the first time in the network level call processing latency element of the acknowledge message, if the designation includes the network level call processing latency element.

56. The program of claim 52 further comprising a fourth segment for inserting a physical port identifier for a port on which the request message is to be transmitted in the egress physical port identifier element of the request message, if the designation includes the egress physical port identifier element.

57. The program of claim 52 further comprising a fourth segment for inserting a physical port identifier for a designated ingress port in the ingress physical port identifier element of the request message, if the designation includes the ingress physical port identifier element.

58. The program of claim 52 further comprising a fourth segment for inserting a logical port identifier for a designated ingress port in the ingress logical port identifier element of the request message, if the designation includes the ingress logical port identifier element.

59. The program of claim 52 further comprising:
a fourth segment for inserting a first absolute time in the time stamp element of the request message, if the designation includes the time stamp element, said first absolute time being when the time stamp element was inserted; and
a fifth segment for inserting a second absolute time in the time stamp element of the acknowledge message, if the designation includes the time stamp element, said second absolute time being when the acknowledge message was received.

60. The program of claim 52 further comprising a fourth segment for including an element identification octet with each designated element type, where the element identification octet for each of the element types is distinct from the element identification octet for each of the remaining element types.

61. The program of claim 52 where the virtual circuit is a virtual circuit in an asynchronous transfer mode network using private network to network interface protocol.

62. The program of claim 52 where said data signals are signals embodied on computer-readable media or signals embodied in a carrier wave.

63. A network switch for connecting a virtual circuit comprising:
means for receiving a request message from a trace originating node, said request message including a trace transit list, said trace transit list including one or more element types in a vendor specific information portion of the trace transit list, wherein at least one of said element types is a node level call processing latency element, a network level call processing latency element, an egress physical port identifier element, an ingress physical port identifier element, an ingress logical port identifier element, or a time stamp element;
means for adding the one or more element types to the vendor specific information portion of the trace transit list;
means for transmitting the request message toward a trace terminating node; and
means for receiving an acknowledge message from the trace terminating node, said acknowledge message including the trace transit list copied from the request message to the acknowledge message by the trace terminating node.

64. The network switch of claim 63 wherein the trace transit list includes the node level call processing latency element, the network switch further comprising:
means for determining a first difference between a first arrival time for the request message and a first departure time when the request message is to be transmitted toward the trace terminating node;

means for inserting the first difference in the node level call processing latency element of the request message;

means for determining a second difference between a second arrival time for the acknowledge message and a second departure time when the acknowledge message is to be transmitted toward the trace originating node; and means for inserting the second difference in the node level call processing latency element of the acknowledge message.

65. The network switch of claim 64 where the means for determining the second difference and the means for inserting the second difference function only if the acknowledge message indicates that a connection was successfully established.

66. The network switch of claim 63 wherein the trace transit list includes the network level call processing latency element, the network switch further comprising:

means for recording a first arrival time for the request message; and means for inserting a difference between a second arrival time for the acknowledge message and the first arrival time, in the network level call processing latency element of the acknowledge message.

67. The network switch of claim 63 wherein the trace transit list includes the egress physical port identifier element, the network switch further comprising means for inserting a physical port identifier for a port on which the request message is to be transmitted in the egress physical port identifier element of the request message.

68. The network switch of claim 63 wherein the trace transit list includes the ingress physical port identifier element, the network switch further comprising inserting a physical port identifier for a port on which the request message was received in the ingress physical port identifier element of the request message.

69. The network switch of claim 63 wherein the trace transit list includes the ingress logical port identifier element, the network switch further comprising means for inserting a logical port identifier for a port on which the request message was received in the ingress logical port identifier element of the request message.

70. The network switch of claim 63 wherein the trace transit list includes the time stamp element, the network switch further comprising:

means for inserting a first absolute time when the request message was received in the time stamp element of the request message; and means for inserting a second absolute time when the acknowledge message was received in the time stamp element of the acknowledge message.

71. The network switch of claim 63 where each of the element types includes an element identification octet that is distinct from the element identification octet for each of the remaining element types.

72. The network switch of claim 63 where the virtual circuit is a virtual circuit in an asynchronous transfer made network using private network to network interface protocol.

73. A network switch for connecting a virtual circuit comprising:

means for receiving a designation of one or more element types to be inserted in a vendor specific information portion of a trace transit list at a trace originating node, wherein at least one of said element types is a node level call processing latency element, a network level call processing latency element, an egress physical port identifier element, an ingress physical port identifier element, an ingress logical port identifier element, or a time stamp element;

means for transmitting a request message toward a trace terminating node, said request message having the trace transit list including vendor specific information octets with the designated element types; and means for receiving an acknowledge message from the trace terminating node, said acknowledge message including the trace transit list copied from the request message to the acknowledge message by the trace terminating node.

74. The network switch of claim 73 wherein the trace transit list includes the node level call processing latency element, the network switch further comprising:

means for determining a first difference between a first time when the node level call processing latency element is inserted in the request message and a first departure time when the request message is to be transmitted toward the trace terminating node;

means for inserting the first difference in the node level call processing latency element of the request message;

means for determining a second difference between a second arrival time for the acknowledge message and a second time when the acknowledge message is processed; and means for inserting the second difference in the node level call processing latency element of the acknowledge message.

75. The network switch of claim 74 where means for determining and means for inserting the second difference function only if the acknowledge message indicates that a connection was successfully established.

76. The network switch of claim 73 wherein the trace transit list includes the network level call processing latency element, the network switch further comprising:

means for recording a first time when the network level call processing latency element is inserted in the request message; and means for inserting a difference between a second time when the acknowledge message is received and the first time in the network level call processing latency element of the acknowledge message.

77. The network switch of claim 73 wherein the trace transit list includes the egress physical port identifier element, the network switch further comprising means for inserting a physical port identifier for a port on which the request message is to be transmitted in the egress physical port identifier element of the request message.

78. The network switch of claim 73 wherein the trace transit list includes the ingress physical port identifier element, the network switch further comprising means for inserting a physical port identifier for a designated ingress port in the ingress physical port identifier element of the request message.

79. The network switch of claim 73 wherein the trace transit list includes the ingress logical port identifier element, the network switch further comprising means for inserting a logical port identifier for a designated ingress port in the ingress logical port identifier element of the request message.

80. The network switch of claim 73 wherein the trace transit list includes the time stamp element, the network switch further comprising:

means for inserting a first absolute time in the time stamp element of the request message, said first absolute time being when the time stamp element was inserted; and means for inserting a second absolute time in the time stamp element of the acknowledge message, said second absolute time being when the acknowledge message was received.

81. The network switch of claim 73 where each of the element types includes an element identification octet that is distinct from the element identification octet for each of the remaining element types.

82. The network switch of claim 73 where the virtual circuit is a virtual circuit in an asynchronous transfer mode network using private network to network interface protocol.

83. A connection oriented network for connecting a virtual circuit from a trace originating node to a trace terminating node, the network comprising a network switch that further comprises:
   a trace transit list parser that indentifies one or more element types present in a vendor specific information portion of a trace transit list, wherein at least one of said element types is a node level call processing latency element, a network level call processing latency element, an egress physical port identifier element, an ingress physical port identifier element, an ingress logical port identifier element, or a time stamp element;
   a trace generator that adds the element types identified by the trace transit list parser, said element types being added to vendor specific information octets in a trace transit list of a request message;
   a request message transmitter that transmits the request message toward the trace terminating node;
   a trace modifier that modifies the element types identified by the trace transit list parser, said element types being modified in the vendor specific information octets in the trace transit list of an acknowledge message;
   a acknowledge message transmitter that transmits the acknowledge message toward the trace originating node.

84. The network switch of claim 83 further comprising:
   a difference unit that determines a first difference between a request message arrival time and a time that the request message is to be transmitted, and that determines a second difference between an acknowledge message arrival time and a time that the acknowledge message is to be transmitted:
   a trace assembly unit that inserts the first difference in the node level call processing latency element of the request message, and that inserts the second difference in the node level call processing latency element of the acknowledge message, if the trace transit list includes the node level call processing latency element.

85. The network switch of claim 84 where the trace assembly unit inserts the second difference only if the acknowledge message indicates that a connection was successfully established.

86. The network switch of claim 83 further comprising:
   a time recorder that records a first arrival time for the request message;
   a difference unit that determines a difference between an arrival time for the acknowledge message and the first arrival time; and
   a trace assembly unit that inserts the difference in the network level call processing latency element of the acknowledge message, if the trace transit list includes the network level call processing latency element.

87. The network switch of claim 83 further comprising a trace assembly unit that inserts a physical port identifier for a port on which the request message is to be transmitted in the egress physical port identifier element of the request message, if the trace transit list includes the egress physical port identifier element.

88. The network switch of claim 83 further comprising a trace assembly unit that inserts a physical port identifier for a port on which the request message was received in the ingress physical port identifier element of the request message, if the trace transit list includes the ingress physical port identifier element.

89. The network switch of claim 83 further comprising a trace assembly unit that inserts a logical port identifier for a port on which the request message was received in the ingress logical port identifier element of the request message, if the trace transit list includes the ingress logical port identifier element.

90. The network switch of claim 83 further comprising a trace assembly unit that inserts a request message receipt time in the time stamp element of the request message, and inserts an acknowledge message receipt time in the time stamp element of the acknowledge message, if the trace transit list includes the time stamp element.

91. The network switch of claim 83 further comprising an element identification unit that inserts an element identification octet in each designated element type, where the element identification octet for each of the element types is distinct from the element identification octet for each of the remaining element types.

92. The network switch of claim 83 where the virtual circuit is a virtual circuit in an asynchronous transfer mode network using private network to network interface protocol.

93. A connection oriented network for connecting a virtual circuit from a trace originating node to a trace terminating node, the network comprising a network switch that further comprises:
   a trace option store that holds a designation of one or more element types to be inserted in vendor specific information octets of a trace transit list, wherein at least one of said element types is a node level call processing latency element, a network level call processing latency element, an egress physical port identifier element, an ingress physical port identifier element, an ingress logical port identifier element, or a time stamp element;
   a trace generator that adds the element types designated in the trace option store, said element types being added to the vendor specific information octets of the trace transit list of a request message; and
   a request message transmitter that transmits the request message toward the trace terminating node.

94. The network switch of claim 93 further comprising:
   a difference unit that determines a first difference between a first time when the node level call processing latency element is inserted in the request message and a time that the request message is to be transmitted, and that determines a second difference between an arrival time of an acknowledge message and a second time when the acknowledge message is processed;
   a trace assembly unit that inserts the first difference in the node level call processing latency element of the request message, and that inserts the second difference in the node level call processing latency element of the acknowledge message, if the designation includes the node level call processing latency element.

95. The network switch of claim 94 where the trace assembly unit inserts the second difference only if the acknowledge message indicates that a connection was successfully established.

96. The network switch of claim 93 further comprising:
a time recorder that records a first time when the network level call processing latency element is inserted in the request message;
a difference unit that determines a difference between an arrival time for an acknowledge message and the first time; and
a trace assembly unit that inserts the difference in the network level call processing latency element of the acknowledge message, if the designation includes the network level call processing latency element.

97. The network switch of claim 93 further comprising a trace assembly unit that inserts a physical port identifier for a port on which the request message is to be transmitted in the egress physical port identifier element of the request message, if the designation includes the egress physical port identifier element.

98. The network switch of claim 93 further comprising a trace assembly unit that inserts a physical port identifier for a designated ingress port in the ingress physical port identifier element of the request message, if the designation includes the ingress physical port identifier element.

99. The network switch of claim 93 further comprising a trace assembly unit that inserts a logical port identifier for a designated ingress port in the ingress logical port identifier element of the request message, if the designation includes the ingress logical port identifier element.

100. The network switch of claim 93 further comprising a trace assembly unit that inserts a request message time stamp element insertion time in the time stamp element of the request message, and inserts a receipt time of an acknowledge message in the time stamp element of the acknowledge message, if the designation includes the time stamp element.

101. The network switch of claim 93 further comprising an element identification unit that inserts an element identification octet in each designated element type, where the element identification octet for each of the element types is distinct from the element identification octet for each of the remaining element types.

102. The network switch of claim 93 where the virtual circuit is a virtual circuit in an asynchronous transfer mode network using private network to network interface protocol.

* * * * *